United States Patent
Chiang et al.

(10) Patent No.: US 9,521,222 B1
(45) Date of Patent: Dec. 13, 2016

(54) MOBILE COMMUNICATION DEVICE (71) Applicant: Acer Incorporated, New Taipei (TW)

(72) Inventors: Hsin-Wu Chiang, New Taipei (TW); Wan-Chu Wei, New Taipei (TW); Pei-Chi Ma, New Taipei (TW); Pei-Yuan Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/057,125

(22) Filed: Mar. 1, 2016

(30) Foreign Application Priority Data

Nov. 25, 2015  (TW) .............................. 104139251 A (51) Int. Cl.
*H04M 1/00* (2006.01)
*H04M 1/02* (2006.01)
*H01Q 1/24* (2006.01)
*H04W 88/02* (2009.01)

(52) U.S. Cl.
CPC ............. *H04M 1/026* (2013.01); *H01Q 1/243* (2013.01); *H04W 88/02* (2013.01)

(58) Field of Classification Search
CPC ........ H04M 1/026; H01Q 1/243; H04W 88/02
USPC ............................................ 455/575.5, 575.7
See application file for complete search history.

(56) References Cited

U.S. PATENT DOCUMENTS

| | | | | |
|---|---|---|---|---|
| 8,912,961 B2 * | 12/2014 | Hallivuori | ............... | H01Q 1/243 343/702 |
| 9,172,142 B2 * | 10/2015 | Sudo | ......................... | H01Q 1/48 |
| 9,268,420 B2 * | 2/2016 | Liu | .......................... | G06F 3/041 |
| 2004/0066337 A1 * | 4/2004 | Fukuda | .................... | H01P 1/213 343/700 MS |
| 2007/0141806 A1 * | 6/2007 | Uemura | .................. | H01L 33/40 438/458 |
| 2010/0117916 A1 * | 5/2010 | Gustafsson | ............ | H01Q 1/243 343/839 |
| 2012/0229343 A1 * | 9/2012 | Sudo | ......................... | H01Q 1/38 343/700 MS |
| 2012/0299841 A1 * | 11/2012 | Tang | .................... | H01Q 1/1271 345/173 |

(Continued)

FOREIGN PATENT DOCUMENTS

TW             201417390         5/2014

OTHER PUBLICATIONS

Liu et al., "High-Gain Printed Dipole Antenna", Microwave and Optical Technology Letters, Aug. 5, 2005, pp. 214-218.

*Primary Examiner* — Shahriar Behnamian
(74) *Attorney, Agent, or Firm* — Jianq Chyun IP Office (57) ABSTRACT

A mobile communication device includes a substrate, a frame, a ground plane, and an antenna element. The substrate includes a first surface and a side wall. The frame includes a frame portion adjacent to the side wall. The ground plane is arranged on the first surface and includes a notch. An opening of the notch faces the frame portion. The antenna element includes a first radiation portion having a feeding point, a second radiation portion electrically connected to the ground plane, a third radiation portion electrically connected to the first radiation portion, and a fourth radiation portion electrically connected to the second radiation portion. Orthogonal projections of the first and second radiation portions on the first surface are located in the notch of the ground plane, and the third and fourth radiation portions are located on the frame portion or the side wall of the substrate.

10 Claims, 7 Drawing Sheets

(56) References Cited

U.S. PATENT DOCUMENTS

2014/0097994 A1\* 4/2014 Wong ................ H01Q 1/243
343/750

\* cited by examiner

MOBILE COMMUNICATION DEVICE

CROSS-REFERENCE TO RELATED APPLICATION

This application claims the priority benefit of Taiwan application serial no. 104139251, filed on Nov. 25, 2015. The entirety of the above-mentioned patent application is hereby incorporated by reference herein and made a part of this specification.

FIELD OF INVENTION

The invention relates to a mobile communication device, and particularly to a mobile communication device in which a part of an antenna element is arranged on a frame of the mobile communication device.

DESCRIPTION OF RELATED ART

With the rapid development of the wireless communication technology, mobile communication devices including smart phones, tablet PCs, and notebook computers have been playing an important role in the daily lives of human beings. The mobile communication device is capable of supporting diverse wireless communication functions. For instance, the mobile communication device is able to support a global positioning system (GPS). Among the existing mobile communication devices, the antenna element serving to support the GPS is often composed of a ceramic chip antenna, a planar inverted-F antenna (PIFA), or a monopole antenna.

The method of manufacturing the ceramic chip antenna is rather complicated; hence, the resultant ceramic chip antenna is costly, and the production costs of the mobile communication device are increased. Besides, the radiation patterns of the PIFA and the monopole antenna are apt to be affected by image current of a ground plane; therefore, the PIFA and the monopole antenna often radiate toward the bottom of the mobile communication device and thus cannot easily receive GPS satellite signals from the sky.

SUMMARY

The invention is directed to a mobile communication device in which parts of radiation portions in an antenna element are arranged on a frame, and a radiation pattern of the antenna element can be concentrated on top of the frame. Thereby, the mobile communication device can easily receive GPS satellite signals through the antenna element, and production costs of the mobile communication device can be reduced.

In an embodiment of the invention, a mobile communication device that includes a substrate, a frame, a ground plane, and an antenna element is provided. The substrate includes a first surface and a side wall adjacent to the first surface. The frame includes a frame portion adjacent to the side wall. The ground plane is arranged on the first surface and includes a notch. An opening of the notch faces the frame portion. The antenna element includes a first radiation portion having a feeding point, a second radiation portion electrically connected to the ground plane, a third radiation portion electrically connected to the first radiation portion, and a fourth radiation portion electrically connected to the second radiation portion. Orthogonal projections of the first radiation portion and the second radiation portion on the first surface are located in the notch of the ground plane, and the third radiation portion and the fourth radiation portion are located on the frame portion or the side wall of the substrate.

According to an embodiment of the invention, the antenna element is a dipole antenna, and the ground plane reflects an electromagnetic wave radiated from the dipole antenna.

According to an embodiment of the invention, the antenna element further includes a fifth radiation portion. The fifth radiation portion is arranged on the frame portion. A first end of the third radiation portion is electrically connected to a first end of the fifth radiation portion and the first radiation portion. A first end of the fourth radiation portion is electrically connected to a second end of the fifth radiation portion and the second radiation portion. A second end of the third radiation portion and a second end of the fourth radiation portion are respectively an open end.

In view of the above, parts of the radiation portions in the mobile communication device are arranged on the frame portion of the frame, and the frame portion faces the opening of the notch of the ground plane. In addition, the radiation pattern of the antenna element can be concentrated above the frame portion. Thereby, the mobile communication device can easily receive GPS satellite signals from the antenna element, and production costs of the mobile communication device can be reduced.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
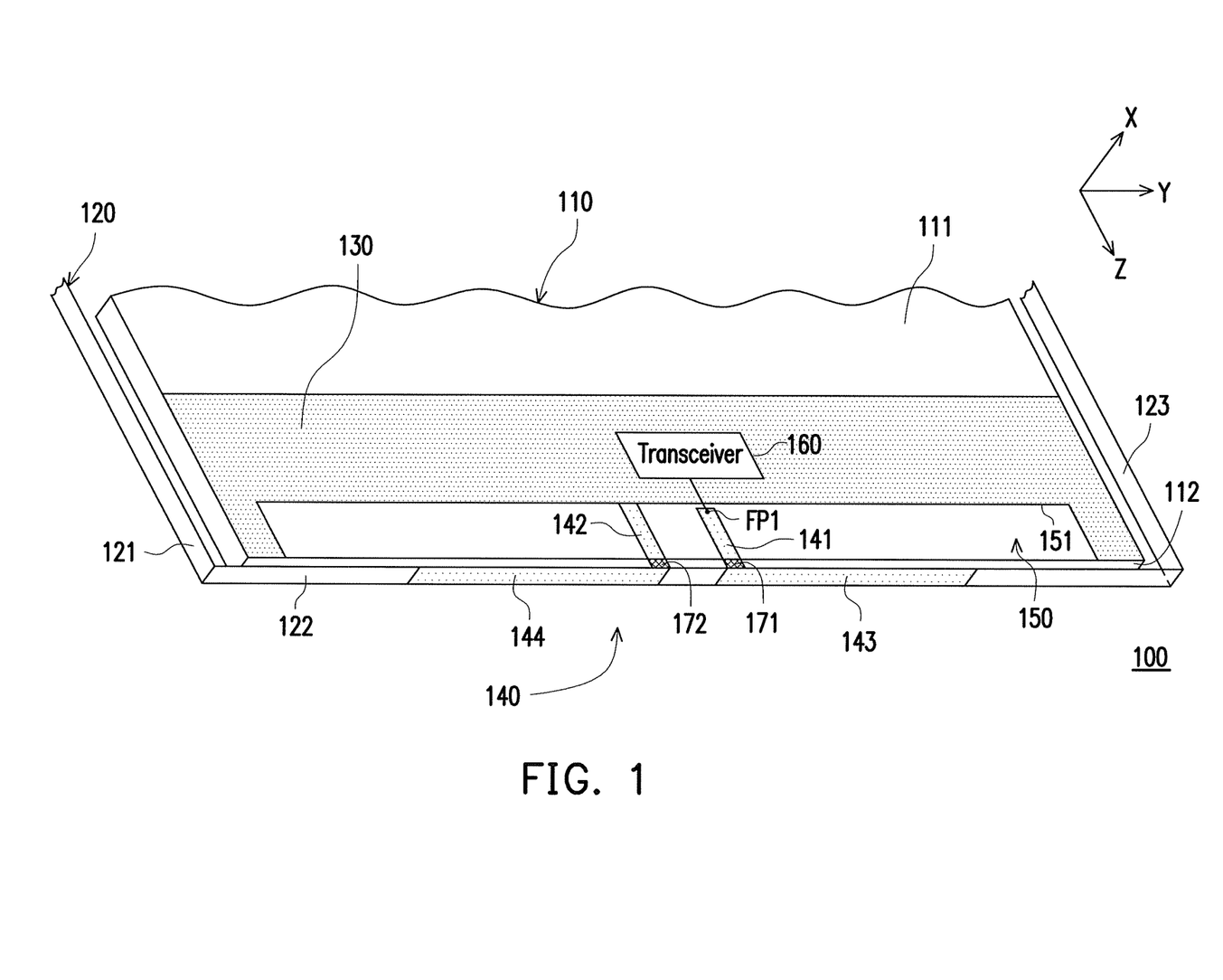
FIG. 1 is a schematic view illustrating a mobile communication device according to an embodiment of the invention.

FIG. 1 is a schematic view illustrating a mobile communication device according to an embodiment of the invention. As shown in FIG. 1, a mobile communication device 100 includes a substrate 110, a frame 120, a ground plane 130, and an antenna element 140. The substrate 110 includes a first surface 111 and a side wall 112 adjacent to the first surface 111. The frame 120 includes a plurality of frame portions 121-123 connected together, and the frame portion 122 is adjacent to the side wall 112 of the substrate 110. In addition, the frame portion 122 may be parallel to the side wall 112 of the substrate 110, for instance.

The ground plane 130 is arranged on the first surface 111 of the substrate 110 and includes a notch 150. The notch 150 exposes the first surface 111, and an opening of the notch 150 faces the frame portion 122. The antenna element 140 includes a first radiation portion 141, a second radiation portion 142, a third radiation portion 143, and a fourth radiation portion 144. The first radiation portion 141 has a feeding point FP1 to receive a feeding signal generated by a transceiver 160 of the mobile communication device 100. Besides, the first radiation portion 141 is electrically connected to the third radiation portion 143. The second radiation portion 142 is electrically connected to the ground plane 130, and the second radiation portion 142 is electrically connected to the fourth radiation portion 144.

In terms of the overall arrangement, the first radiation portion 141 and the second radiation portion 142 are arranged on the first surface 111 of the substrate 110, and the first radiation portion 141 and the second radiation portion 142 are located in the notch 150 of the ground plane 130. Namely, the notch 150 of the ground plane 130 may serve to form a clearance area of the antenna element 140. Specifically, the feeding portion FP1 of the first radiation portion 141 is adjacent to a bottom portion 151 of the notch 150. The second radiation portion 142 extends from the bottom portion 151 of the notch 150. Besides, the first radiation portion 141 and the second radiation portion 142 both extend in a direction away from the bottom portion 151 of the notch 150 (e.g., the direction of the +Z axis), so as to be connected to the third radiation portion 143 and the fourth radiation portion 144.

The third radiation portion 143 and the fourth radiation portion 144 are arranged on the frame portion 122 and face the opening of the notch 150. Besides, a first end of the third radiation portion 143 is electrically connected to the first radiation portion 141 through a connection element 171, and a second end of the third radiation portion 143 is an open end. A first end of the fourth radiation portion 144 is electrically connected to the second radiation portion 142 through a connection element 172, and a second end of the fourth radiation portion 144 is an open end. The connection elements 171 and 172 may be elastic pieces, screws, or any other element with electrically conductivity.

The first to fourth radiation portions 141-144 may constitute a dipole antenna, i.e., the antenna element 140 may be a dipole antenna. In terms of operations, the antenna element 140 (e.g., the dipole antenna) may receive the feeding signal from the transceiver 160 through the feeding point FP1 and may operate in a predetermined frequency band. The total length of the third radiation portion 143 and the fourth radiation portion 144 is ½ the wavelength of the lowest frequency of the predetermined frequency band. Besides, when the antenna element 140 (e.g., the dipole antenna) is being excited by the feeding signal, the radiation pattern of the antenna element 140 can be concentrated in the direction of the +Z axis. Note that the ground plane 130 can reflect the electromagnetic wave radiated from the antenna element 140 (e.g., the dipole antenna) and further enhance the directivity of the antenna element 140.

Figure 2:
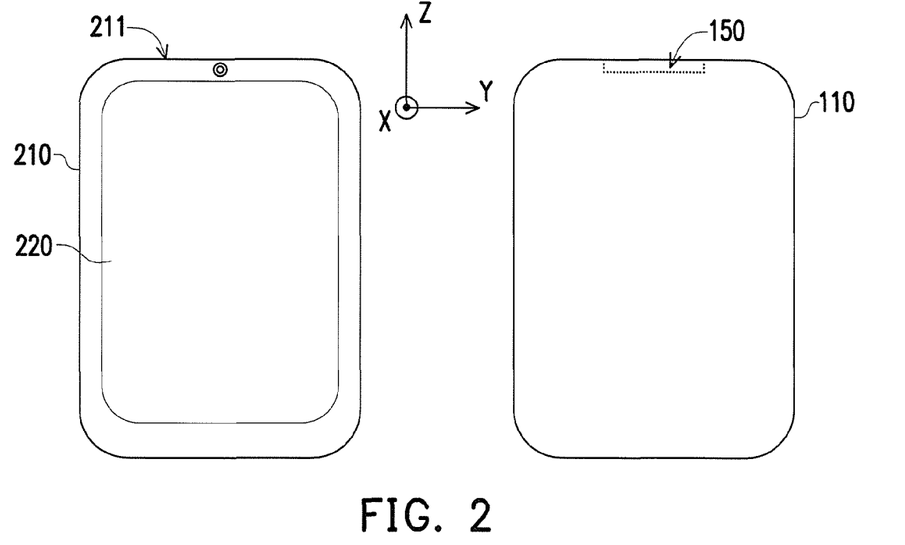
FIG. 2 is a schematic view illustrating an appearance of a mobile communication device and a substrate according to an embodiment of the invention.
Figure 3:
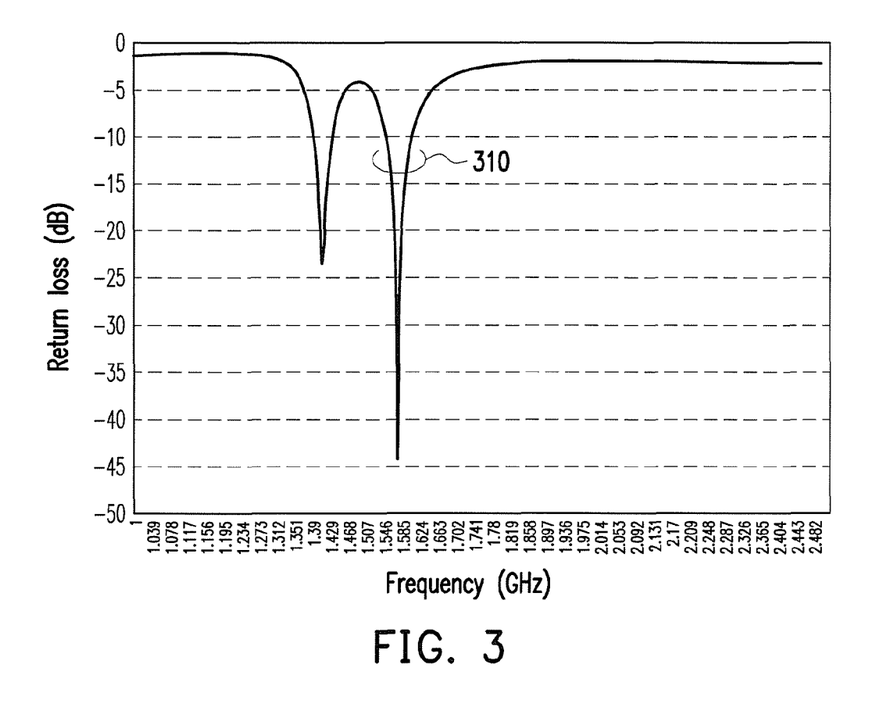
FIG. 3 illustrates return loss of an antenna element according to an embodiment of the invention.

FIG. 2 is a schematic view illustrating an appearance of a mobile communication device and a substrate according to an embodiment of the invention. FIG. 3 illustrates return loss of an antenna element according to an embodiment of the invention. As shown in FIG. 2, the mobile communication device 100 further includes a casing 210 and a display panel 220. The frame 120 is a portion of the casing 210. The frame portion 122 of the frame 120 may serve to form a short side 211 of the casing 210, for instance. The display panel 220 is arranged on a front side of the casing 210. Besides, the notch 150 (i.e., the clearance area) on the substrate 110 is adjacent to the short side 211 of the casing 210.

Figure 4:
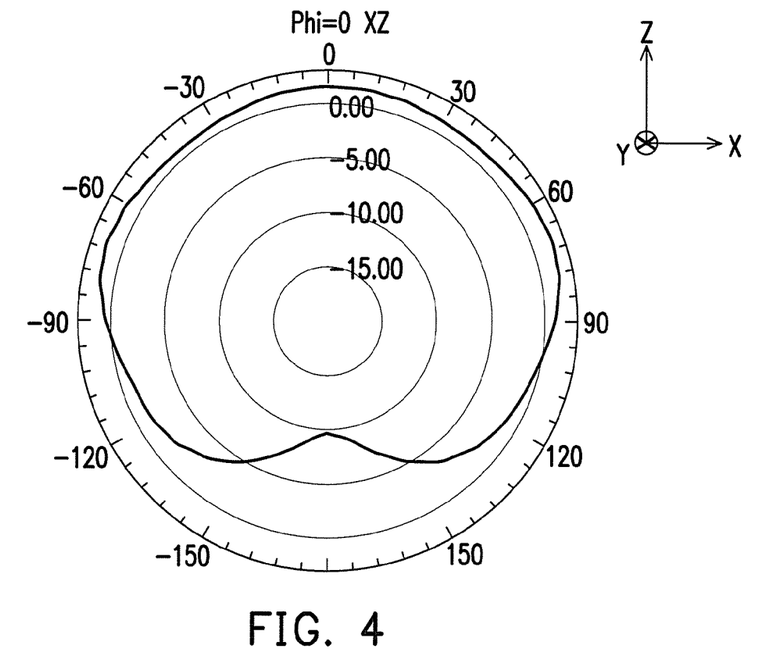
FIG. 4 illustrates a radiation pattern of an antenna element on an X-Z plane according to an embodiment of the invention.
Figure 5:
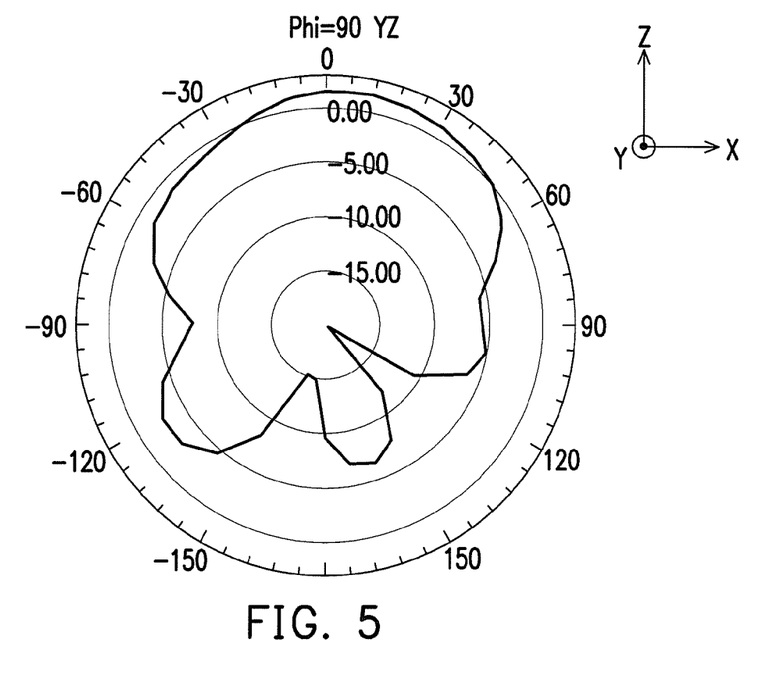
FIG. 5 illustrates a radiation pattern of an antenna element on an Y-Z plane according to an embodiment of the invention.

As to the operation, as shown in FIG. 3, the antenna element 140 may operate in a predetermined frequency band 310, and a center frequency of the predetermined frequency band 310 may be 1.575 GHz, for instance. FIG. 4 illustrates a radiation pattern of an antenna element on an X-Z plane according to an embodiment of the invention. FIG. 5 illustrates a radiation pattern of an antenna element on a Y-Z plane according to an embodiment of the invention. As shown in FIG. 4 and FIG. 5, the radiation pattern of the antenna element 140 can be concentrated in the direction of the +Z axis. That is, the radiation pattern of the antenna element 140 may be concentrated on top of the frame 120 of the mobile communication device 100, which allows the mobile communication device 100 to better receive the GPS satellite signals from the sky through the antenna element 140.

Figure 6:
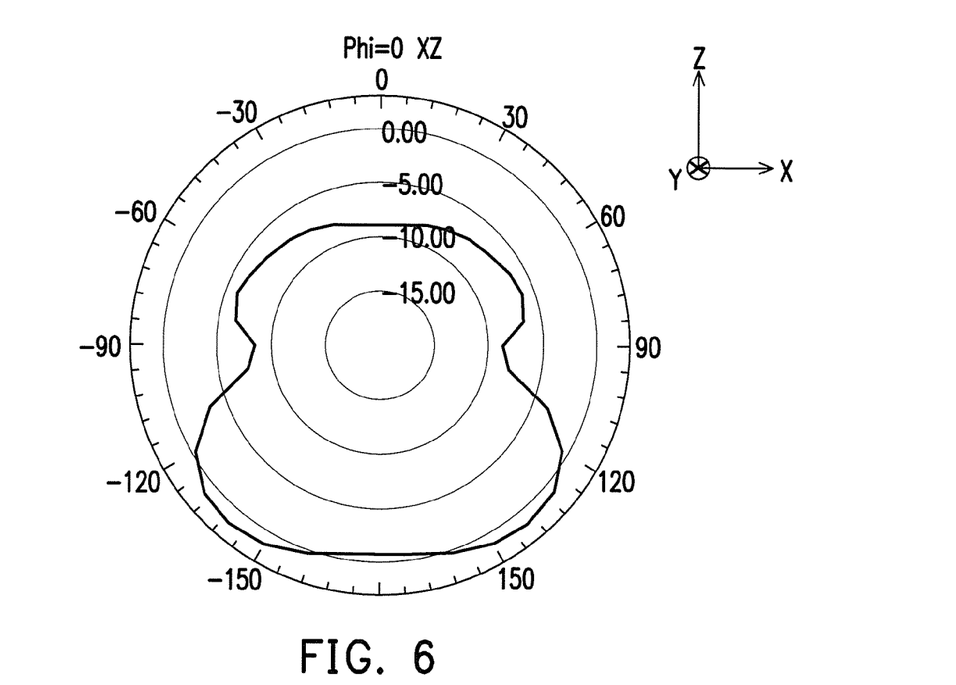
FIG. 6 and FIG. 7 illustrate radiation patterns according to the related art.
Figure 7:
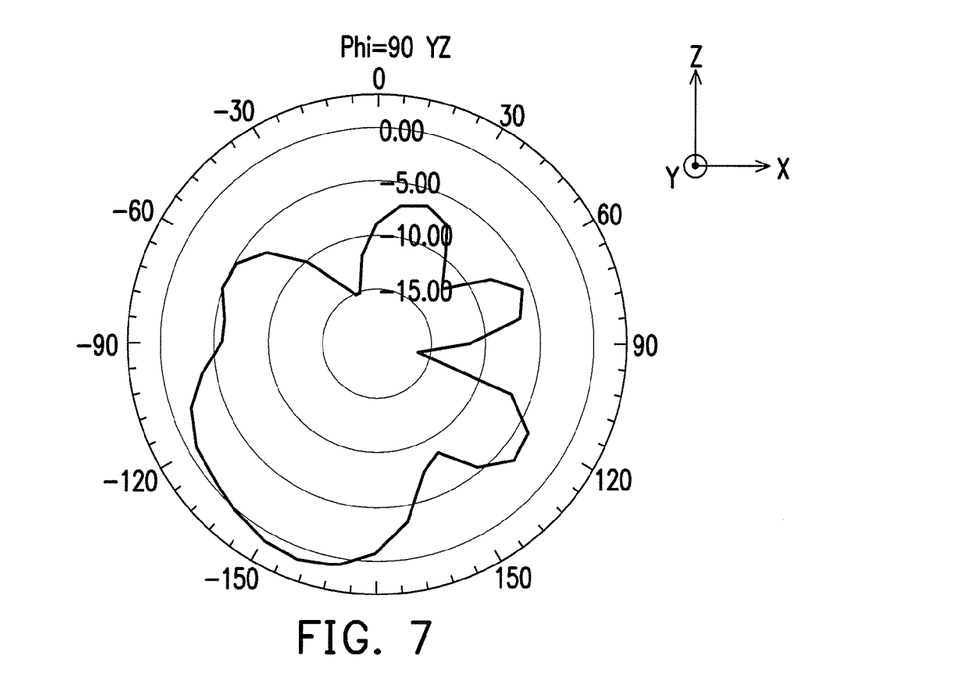

FIG. 6 and FIG. 7 illustrate radiation patterns according to the related art. Specifically, according to the related art, a PIFA or a monopole antenna is often directly arranged in the notch 150 (i.e., the clearance area) of the ground plane 130. Besides, when the PIFA or the monopole antenna is directly arranged in the notch 150 (i.e., the clearance area), the radiation patterns of the PIFA or the monopole antenna on the X-Z plane and the Y-Z plane are respectively shown in FIG. 6 and FIG. 7. Particularly, the PIFA or the monopole antenna directly arranged in the notch 150 may be affected by the current distribution of the ground plane 130, such that the radiation pattern of the antenna is concentrated in the direction of the −Z axis. That is, the radiation pattern of the antenna may be concentrated on bottom of the mobile communication device 100, and thus it is rather difficult for the mobile communication device 100 to receive the GPS satellite signals from the sky.

Compared to the radiation pattern of the antenna provided in the related art, the radiation pattern of the antenna element 140 shown in FIG. 1 may be concentrated on top of the mobile communication device 100, which allows the mobile communication device 100 to better receive the GPS satellite signals from the sky through the antenna element 140. In addition, since parts of the radiation portions are arranged on the frame 120, the clearance area of the antenna element 140 can be reduced. For instance, the shape of the notch 150 (i.e., the clearance area) shown in FIG. 1 may be of a narrow and long design. Thereby, the integrity of the substrate 110 can be guaranteed, and the utilization rate of the substrate 110 can be improved. Moreover, the radiation portions arranged on the frame 120 may be far away from the ground plane 130, so as to further enhance the radiation performance of the antenna element 140.

Compared to the existing ceramic chip antenna, the antenna element 140 shown in FIG. 1 can be formed through performing a simplified manufacturing process, and thus the production costs of the mobile communication device 100 can be reduced. In an exemplary embodiment of the invention, the radiation portions (e.g., the third radiation portion 143 and the fourth radiation portion 144) arranged on the frame 120 can be printed on the frame portion 122 of the frame 120. Thereby, the assembly costs of the antenna element 140 can be reduced, and the production costs of the mobile communication device 100 can be further lowered down.

It is known to people having ordinary skill in the pertinent art that the connection elements 171 and 172 may be selectively removed, such that the third radiation portion 143 is directly electrically connected to the first radiation portion 141, and the fourth radiation portion 144 is directly electrically connected to the second radiation portion 142. A fifth radiation portion may be further arranged between the third radiation portion 143 and the fourth radiation portion 144, so as to adjust impedance of the antenna element 140.

Figure 8:
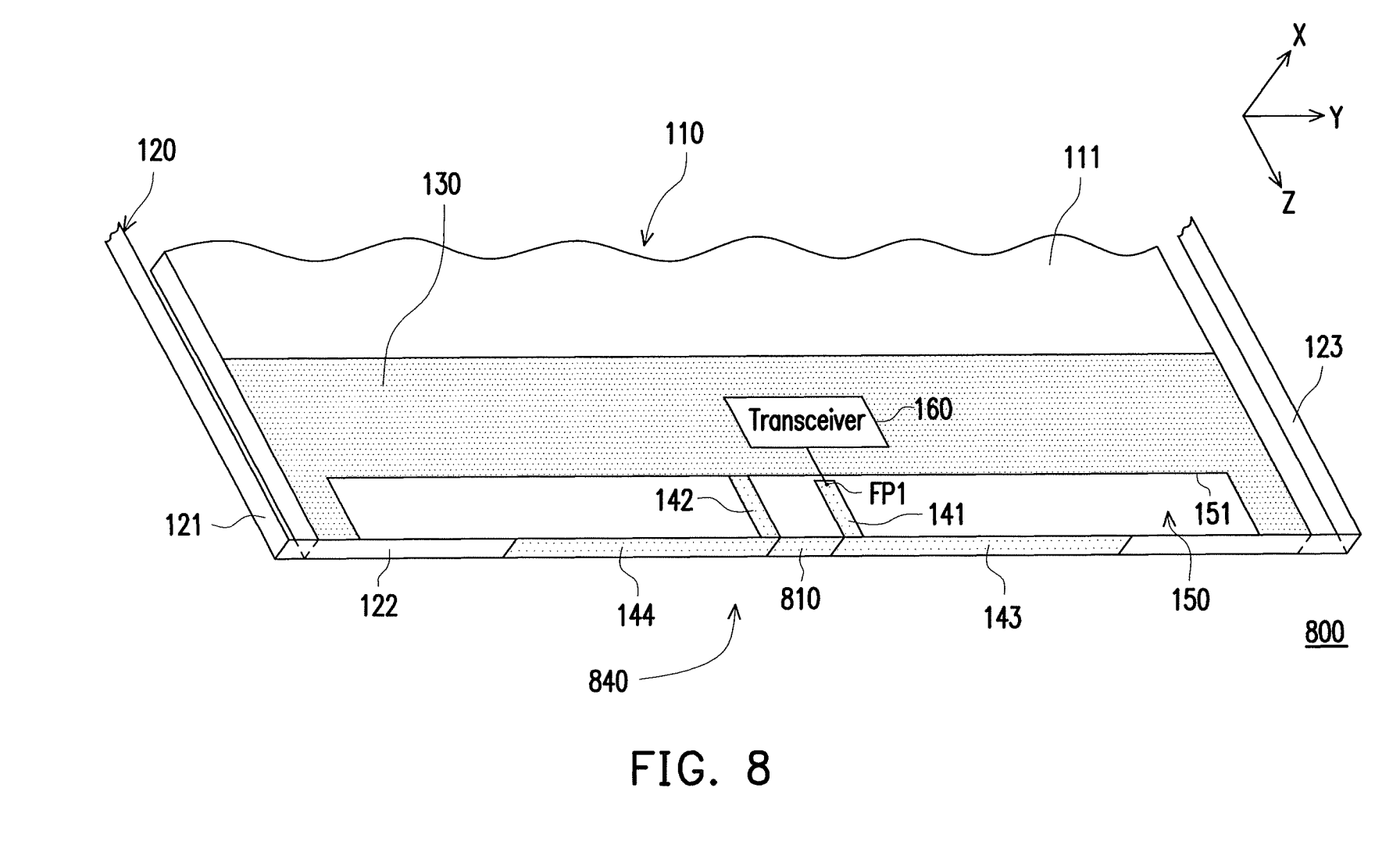
FIG. 8 is a schematic view illustrating a mobile communication device according to another embodiment of the invention.

For instance, FIG. 8 is a schematic view illustrating a mobile communication device according to another embodiment of the invention. Compared to the antenna element 140 shown in FIG. 1, the antenna element 840 in the mobile communication device 800 depicted in FIG. 8 further includes a fifth radiation portion 810, and the side wall 112 of the substrate 100 shown in FIG. 8 is closely attached to the frame portion 122 of the frame 120. Specifically, the fifth radiation portion 810 is arranged on the frame portion 122 and located between the third radiation portion 143 and the fourth radiation portion 144. Besides, a first end of the third radiation portion 143 is electrically connected to a first end of the fifth radiation portion 810 and the first radiation portion 141. A first end of the fourth radiation portion 144 is electrically connected to a second end of the fifth radiation portion 810 and the second radiation portion 142.

As to the operation, the first to fourth radiation portions 141-144 and the fifth radiation portion 810 may together form a dipole antenna that can operate in a predetermined frequency band. The total length of the third radiation portion 143, the fourth radiation portion 144, and the fifth radiation portion 810, i.e., the distance from the second end (the open end) of the third radiation portion 143 to the second end (the open end) to the fourth radiation portion 144, is ½ the wavelength of the lowest frequency of the predetermined frequency band. The first radiation portion 141, the second radiation portion 142, and the fifth radiation portion 810 may form a current loop, and the impedance of the antenna element 840 is changed together with variations in the length of the current loop. Namely, the first radiation portion 141, the second radiation portion 142, and the fifth radiation portion 810 are configured to adjust the impedance of the antenna element 840. The detailed arrangement and operation of the elements provided in the embodiment shown in FIG. 8 are included in the embodiment depicted in FIG. 1 and thus will not be repeated hereinafter.

As provided in the embodiments shown in FIG. 1 and FIG. 8, the first radiation portion 141 and the second radiation portion 142 are shaped as straight lines, and the third radiation portion 143 and the fourth radiation portion 144 can be respectively constituted by a metal line. In another embodiment of the invention, people having ordinary skill in the pertinent art may also arrange at least one adjustment element in the metal line constituting the third radiation portion 143 or the fourth radiation portion 144, so as to reduce the length of the metal line and further reduce the dimension of the antenna element.

Figure 9:
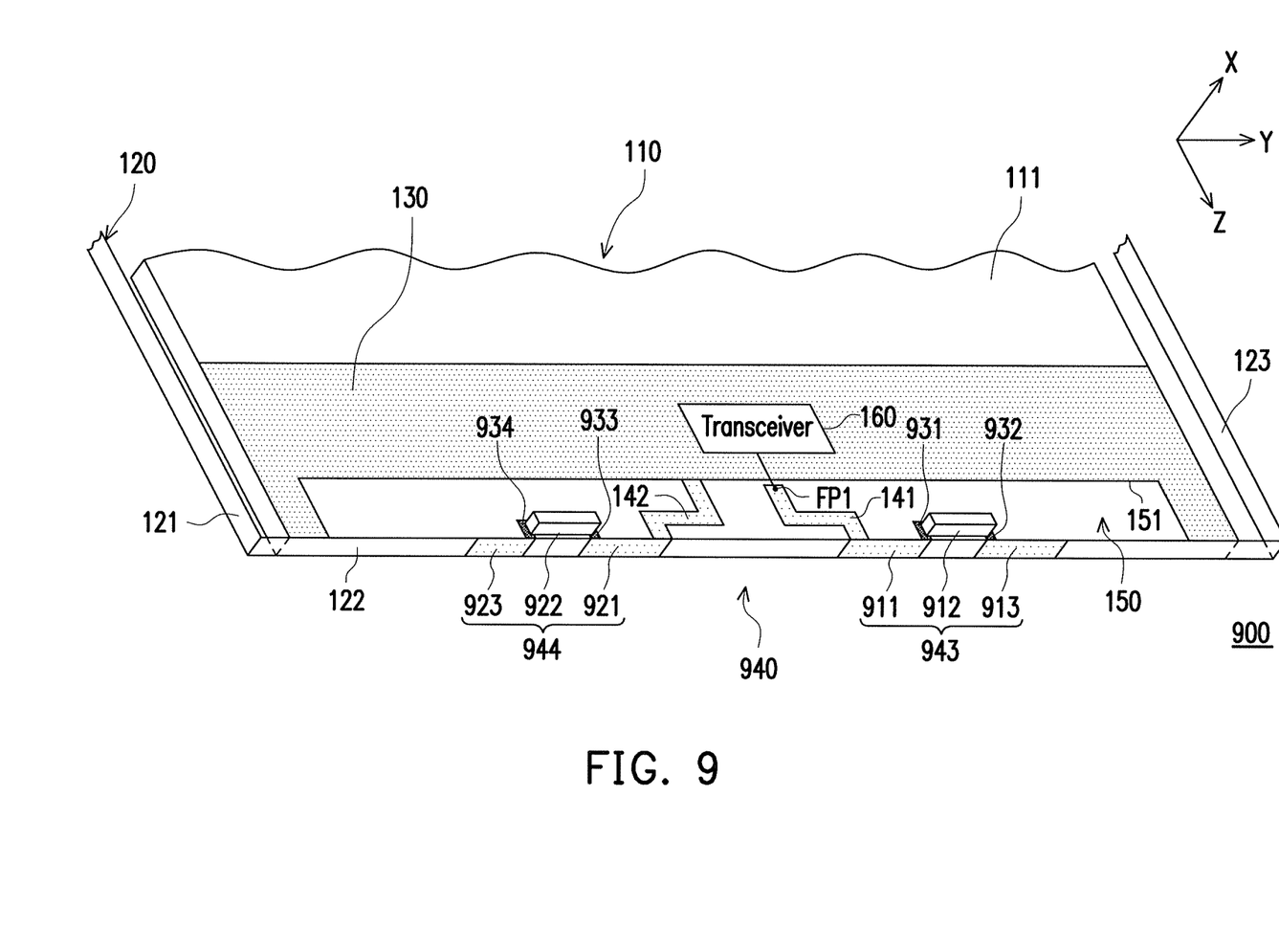
FIG. 9 is a schematic view illustrating a mobile communication device according to still another embodiment of the invention.

FIG. 9 is a schematic view illustrating a mobile communication device according to still another embodiment of the invention. Compared to the antenna element 140 depicted in FIG. 1, the antenna element 940 in the mobile communication device 900 depicted in FIG. 9 includes a first radiation portion 141, a second radiation portion 142, a third radiation portion 943, and a fourth radiation portion 944. The first radiation portion 141 and the second radiation portion 142 shown in FIG. 9 include a plurality of bends, and the side wall 112 of the substrate 110 in FIG. 9 is closely attached to the frame portion 122 of the frame 120. The third radiation portion 943 includes a first line 911, a first adjustment element 912, and a second line 913 that are connected in series with one another. The fourth radiation portion 944 includes a third line 921, a second adjustment element 922, and a fourth line 923 that are connected in series with one another.

Specifically, the first adjustment element 912 is located between the first line 911 and the second line 913 and can be electrically connected to the first line 911 and the second line 913 through bonding points 931 and 932. Likewise, the second adjustment element 922 is located between the third line 921 and the fourth line 923 and can be electrically connected to the third line 921 and the fourth line 923 through bonding points 934 and 933. The bonding points 931-934 are located on the frame portion 122. That is, the first adjustment element 912 and the second adjustment element 922 can be directly bonded to the frame portion 122. Besides, the bonding points 931-934 are adjacent to the first surface 111 of the substrate 110, such that the first adjustment element 912 and the second adjustment element 922 can be located above the first surface 111 of the substrate 110.

The first adjustment element 912 and the second adjustment element 922 are configured to adjust a center frequency of the predetermined frequency band covered by the antenna element 940. Namely, people having ordinary skill in the pertinent art may adjust the frequency range of the predetermined frequency band by means of the first adjustment element 912 and the second adjustment element 922, thus reducing the dimension of the antenna element. Additionally, in an embodiment of the invention, the first adjustment element 912 and the second adjustment element 922 may be constituted by an inductor, respectively. The detailed arrangement and operation of the elements provided in the embodiment shown in FIG. 9 are included in the embodiments provided above and thus will not be repeated hereinafter.

Note that the first radiation portion 141 and the second radiation portion 142 are arranged on the same surface (i.e., the first surface 111) as provided in the embodiments shown in FIG. 1, FIG. 8, and FIG. 9, which should however not be construed as a limitation to the invention. Besides, a fifth radiation portion may be further arranged between the third radiation portion 943 and the fourth radiation portion 944 according to the embodiment shown in FIG. 9, which is similar to the embodiment shown in FIG. 2.

Figure 10:
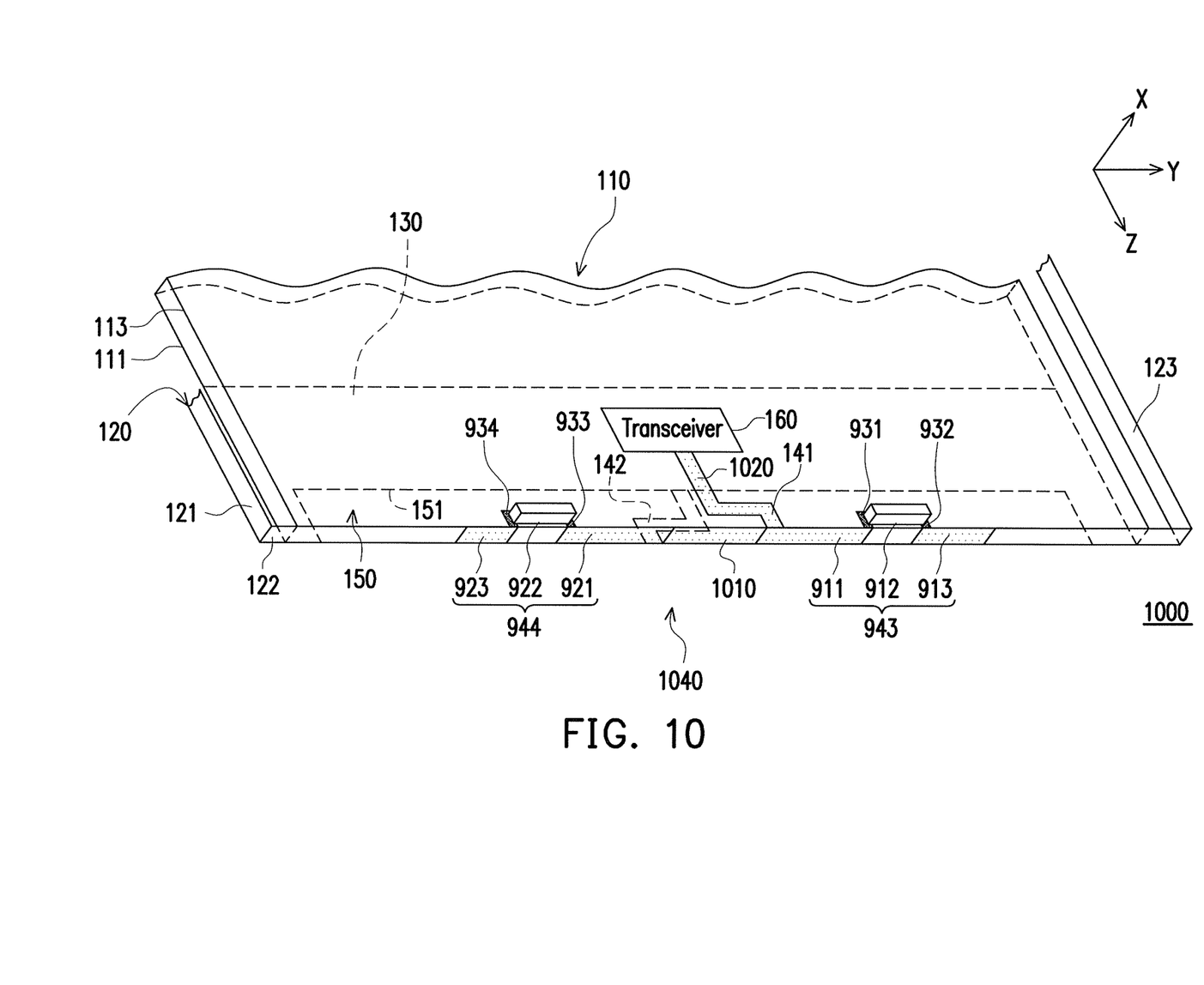
FIG. 10 is a schematic view illustrating a mobile communication device according to still another embodiment of the invention.

For instance, FIG. 10 is a schematic view illustrating a mobile communication device according to still another embodiment of the invention. In comparison with the embodiment shown in FIG. 9, FIG. 10 shows a second surface 113 of the substrate 110, and the first radiation portion 141 and the transceiver 160 in the mobile communication device 1000 shown in FIG. 10 are arranged on the second surface 113 of the substrate 110. Besides, the antenna element 1040 in the mobile communication device 1000 as shown in FIG. 10 further includes a fifth radiation portion 1010.

Specifically, the first surface 111 and the second surface 113 of the substrate 110 are opposite to each other. The first radiation portion 141 is arranged on the second surface 113. The second radiation portion 142 and the ground plane 130 are arranged on the first surface 111. Orthogonal projections of the first radiation portion 141 and the second radiation portion 142 on the first surface 111 are located in the notch 150 of the ground plane 130. Besides, the orthogonal projections of the first radiation portion 141 and the second radiation portion 142 on the first surface 111 are partially overlapped. In another embodiment of the invention, the orthogonal projections of the first radiation portion 141 and the second radiation portion 142 on the first surface 111 may not be overlapped. The first radiation portion 141 depicted in FIG. 10 may be electrically connected to the transceiver 160 through a metal line 1020.

The fifth radiation portion 1010 is electrically connected between the first line 911 and the second line 921. Additionally, the first radiation portion 141, the second radiation portion 142, and the fifth radiation portion 1010 are configured to adjust impedance of the antenna element 1040. In FIG. 10, the bonding points 931-934 are adjacent to the second surface 113 of the substrate 110, such that the first adjustment element 912 and the second adjustment element 922 can be located above the second surface 113 of the substrate 110. The detailed arrangement and operation of the elements provided in the embodiment shown in FIG. 10 are included in the embodiments provided above and thus will not be repeated hereinafter.

Note that the third radiation portion 143/943 and the fourth radiation portion 144/944 are arranged on the frame portion 122 of the frame 120 in FIG. 1, FIG. 8, FIG. 9, and FIG. 10. The locations of the third radiation portion 143/943 and the fourth radiation portion 144/944 are exemplified in the above embodiments, which should however not be construed as limitations to the invention. In another embodiment of the invention, the third radiation portion 143/943 and the fourth radiation portion 144/944 may also be arranged on the side wall 112 of the substrate 110. In the embodiments shown in FIG. 1 and FIG. 8, the first to fourth radiation portions 141-143 may also be printed on the first surface 111 and the side wall 112 of the substrate 110. The third radiation portion 143 and the fourth radiation portion 144 are directly printed on the side wall 112 of the substrate 110, and therefore it is not necessary to arrange the connection elements 171 and 172 in the mobile communication device 100 shown in FIG. 1.

In the embodiments shown in FIG. 9 and FIG. 10, the first and second radiation portions 141 and 142 may be directly printed on the first surface 111 or on both surfaces 111 and 113 of the substrate 110, and the first line 911, the second line 913, the third line 921, and the fourth line 923 can be directly printed on the side wall 112 of the substrate 110. In addition, the bonding points 931-934 may be located on the first surface 111 or the second surface 113 of the substrate 110. That is, the first adjustment element 912 and the second adjustment 922 can be directly bonded on the first surface 111 or the second surface 113.

To sum up, parts of the radiation portions in the mobile communication device are arranged on the frame portion of the frame, and the frame portion faces the opening of the notch of the ground plane. In addition, the radiation pattern of the antenna element can be concentrated above the frame portion. Thereby, the mobile communication device can easily receive GPS satellite signals from the antenna element, and production costs of the mobile communication device can be reduced. Moreover, since parts of the radiation portions in the mobile communication device are arranged on the frame portion, the clearance area of the antenna element can be reduced, so as to ensure the integrity of the substrate and improve the utilization rate of the substrate.

The radiation portions arranged on the frame portion may be far away from the ground plane, so as to enhance the radiation performance of the antenna element.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A mobile communication device comprising:
   a substrate comprising a first surface and a side wall adjacent to the first surface;
   a frame comprising a frame portion adjacent to the side wall;
   a ground plane arranged on the first surface and comprising a notch, an opening of the notch facing the frame portion; and
   an antenna element comprising a first radiation portion having a feeding point, a second radiation portion electrically connected to the ground plane, a third radiation portion electrically connected to the first radiation portion, and a fourth radiation portion electrically connected to the second radiation portion,
   wherein orthogonal projections of the first radiation portion and the second radiation portion on the first surface are located in the notch of the ground plane, and the third radiation portion and the fourth radiation portion are located on the frame portion or the side wall of the substrate.

2. The mobile communication device as recited in claim 1, wherein the antenna element is a dipole antenna, and the ground plane reflects an electromagnetic wave radiated from the dipole antenna.

3. The mobile electronic device as recited in claim 1, wherein the first radiation portion and the second radiation portion are arranged on the first surface.

4. The mobile electronic device as recited in claim 1, wherein the substrate further comprises a second surface opposite to the first surface, the first radiation portion is arranged on the second surface, and the second radiation portion is arranged on the first surface.

5. The mobile electronic device as recited in claim 1, wherein the antenna element operates in a predetermined frequency band, the third radiation portion comprises a first line, a first adjustment element, and a second line connected in series with one another, the fourth radiation portion comprises a third line, a second adjustment element, and a fourth line connected in series with one another, and the first adjustment element and the second adjustment element are configured to adjust a center frequency of the predetermined frequency band.

6. The mobile electronic device as recited in claim 5, wherein the first line is electrically connected to the first radiation portion, the first adjustment element is located between the first line and the second line, the third line is electrically connected to the second radiation portion, and the second adjustment element is located between the third line and the fourth line.

7. The mobile electronic device as recited in claim 6, wherein the antenna element further comprises:
   a fifth radiation portion arranged on the frame portion and electrically connected between the first line and the third line.

8. The mobile electronic device as recited in claim 1, wherein the antenna element further comprises:

a fifth radiation portion arranged on the frame portion,
wherein a first end of the third radiation portion is electrically connected to a first end of the fifth radiation portion and the first radiation portion, a first end of the fourth radiation portion is electrically connected to a second end of the fifth radiation portion and the second radiation portion, and a second end of the third radiation portion and a second end of the fourth radiation portion are respectively an open end.

9. The mobile electronic device as recited in claim 8, wherein the antenna element operates in a predetermined frequency band, and a total length of the third radiation portion, the fourth radiation portion, and the fifth radiation portion is ½ a wavelength of a lowest frequency of the predetermined frequency band.

10. The mobile electronic device as recited in claim 8, wherein the first radiation portion, the second radiation portion, and the fifth radiation portion are configured to adjust impedance of the antenna element.

* * * * *